Patented May 14, 1935

2,001,419

UNITED STATES PATENT OFFICE 2,001,419

ANTHRAQUINONE ACRIDONE VAT DYESTUFF

Ivan Gubelmann and Robert J. Goodrich, South Milwaukee, and William Dettwyler, Milwaukee, Wis., assignors, by mesne assignments, to E. I. du Pont de Nemours & Company, a corporation of Delaware No Drawing. Application April 30, 1931, Serial No. 534,135

8 Claims. (Cl. 260—36)

This invention relates to a process of condensing a halogen 1(N),2-anthraquinone-acridone containing halogen in the Bz nucleus of the acridone group as well as in an alpha position of the anthraquinone nucleus with an alpha amino anthraquinone body and finally condensing the products obtained which are 1(N),2-acridonyl alpha, alpha'-dianthrimides with acid condensing agents such as concentrated sulphuric acid, aluminum chloride and the like.

This invention also relates to the products produced by the said process.

It is an object of this invention to provide a method of preparing anthraquinone vat dyestuffs which are of great commercial importance in view of their valuable shades and excellent fastness qualities.

Chemically our novel dyestuffs belong to a class whose structure is somewhat disputed in the scientific literature. Some authorities regard the compounds obtainable by analogous methods and from related initial materials as carbazoles, while other authorities regard them as acridines formed by reaction of the imino group with one of the adjacent meso carbon atoms on one of the anthraquinone residues involved. For the purpose of this discussion we shall adopt the latter viewpoint, and refer hereinafter to our novel condensation products as though they were acridines. It should be understood, however, that our invention is not dependent upon any special theory of constitution, and that we therefore do not desire to be limited in the claims hereunto appended by any theory or hypothesis in regard to the structure of our novel products, but desire to claim them broadly as our invention regardless of which theory of constitution is correct.

The initial materials for our process of producing the novel dyestuffs of this invention are Bz-halogen-1,2-acridonyl-alpha - alpha'- dianthrimides, which in turn may be obtained by reacting a Bz-halogen-alpha-halogen-1(N),2-anthraquinone-acridone body with an alpha-amino-anthraquinone body in a high-boiling organic solvent and preferably in the presence of acid binding agents and copper catalysts. More particularly, the initial materials for our present invention as well as the process of preparing them may be illustrated by the following equation:

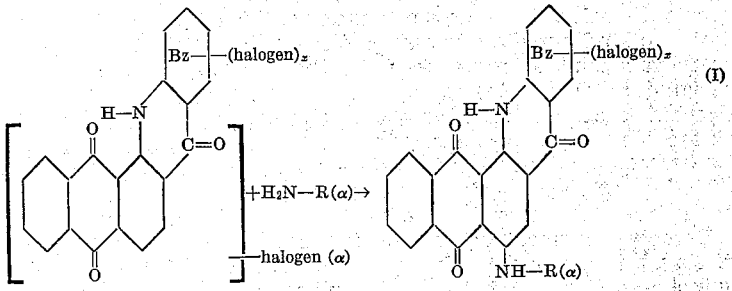

(I)

wherein $x$ stands for one or more while R stands for an anthraquinone residue, substituted or not.

By our present invention we subject said Bz-halogen-1,2-acridonyl-alpha - alpha'- dianthrimides to condensation in the presence of acid condensing agents such as concentrated sulfuric acid or aluminum chloride. Considering for the sake of simplicity the specific initial material obtained by condensing Bz-dichloro-4'-chloro-anthraquinone-1(N),2-acridone with 1-amino-anthraquinone, and adopting for the mere purpose of discussion the viewpoint that the product of the condensation is an acridine and that the meso carbon atom involved in this condensation is the one supplied by the amino-anthraquinone body, our process may be illustrated by the following equation:

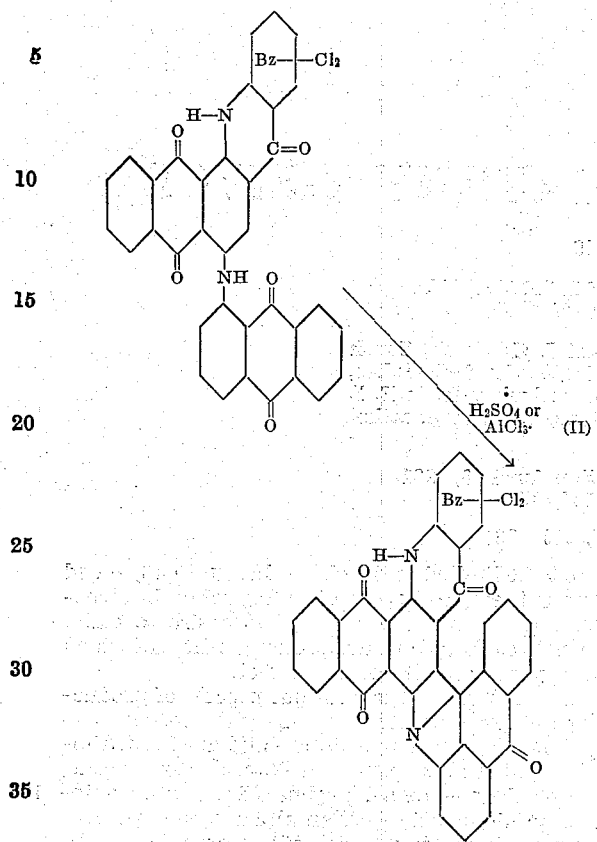

It will be observed again here that even when the assumption is made that the product is an acridine, there still exists the theoretical possibility of two different configurations for the product depending on which of the adjacent meso carbon atoms reacts with the imino group. It should therefore be understood that we do not desire to bind ourselves to any particular theory or formula, but wherever we write the formula designated (II) above, we intend the same to stand as a conventional symbol for the product obtainable by condensing the corresponding Bz-halogen - 1,2 - acridonyl - alpha-alpha'-dianthrimide with acid condensing agents, regardless of the true structure of the product.

Broadly speaking, our invention is based on the discovery that when a poly-halogen 1,2-anthraquinone-acridone, containing halogen both in the Bz nucleus and in an alpha position on the anthraquinone residue, is condensed with alpha amino anthraquinone or its derivatives or substitution products a linkage takes place between the two anthraquinone residues forming an anthrimide and that these anthrimides, containing halogen in the Bz nucleus, can then be treated with acid condensing agents to give novel condensation products. These products are technically important due to the variety and type of shades produced as compared to the formerly known, similar non-halogenated condensation products, and due to their outstanding fastness properties to bleach and light.

We give here below a few examples of the manner in carrying out our process with the understanding that our invention is not limited to these specific examples. These examples are simply illustrations of the manner of effecting differentially the reaction between an alpha amino anthraquinone or its derivatives with a poly halogenated anthraquinone acridone containing halogen both in the Bz nucleus and in the alpha position of the anthraquinone nucleus and the condensation of these products with acid condensing agents to the final dyestuffs. The parts given are parts by weight.

*Example 1*

To 200 parts of nitrobenzene are added 20 parts of tri-chloro anthraquinone acridone, obtainable by chlorinating 1(N),2-anthraquinone acridone in nitrobenzene in the presence of a small amount of iodine at 100° C. by passing in chlorine until evolution of HCl ceases, or until the chlorine content of the acridone is 23-24%. There are then added 12 parts of alpha amino anthraquinone, 20 parts of sodium carbonate and 6 parts of verdigris. The mass is heated with stirring to the reflux temperature for about 5 hours. It is then cooled to room temperature, filtered and the filter cake washed with a small amount of nitrobenzene. It is then washed with alcohol and dried. The product is apparently Bz-dichloro 1,2-acridonyl-4-alpha'-dianthramide having most probably the following formula:

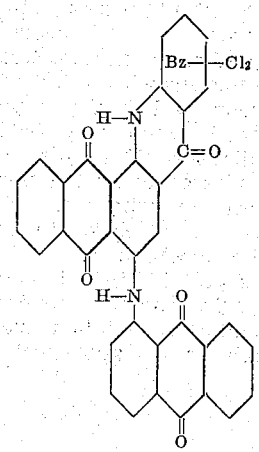

5 parts of this dried anthrimide are then added to 100 parts of 93% sulphuric acid, and the mass heated to 130° C. and held at this temperature for 1 hour. The mass is then discharged on ice and water and the precipitate filtered off and washed thoroughly with water. The paste obtained after vatting dyes cotton in bluish violet shades becoming a yellowish grey to khaki upon oxidizing in the air.

*Example 2*

2 parts of the dry anthrimide body of Example 1 are added to 10 parts anhydrous aluminum chloride. The mixture is ground together and heated to 210° C. for 1 hour. The condensation product is decomposed with water, and the precipitated product filtered off and washed with water. The product after vatting with sodium hydrosulphite dyes cotton in bluish violet shades which after oxidation in the air change to greenish grey in weak dyeings.

*Example 3*

To 200 parts of nitrobenzene are added 20 parts of the halogenated anthraquinone acridone body prepared as in Example 1, 13 parts of 1-amino-2-methyl anthraquinone, 20 parts of soda ash and 6 parts of verdigris. The mass is heated to reflux for 5 hours under agitation. It is then cooled to room temperature, filtered and the filter cake washed with a small amount of nitro-benzene and finally with a little alcohol and then dried. The product obtained is soluble in concentrated sulphuric acid with reddish brown color. It most probably has the following formula:

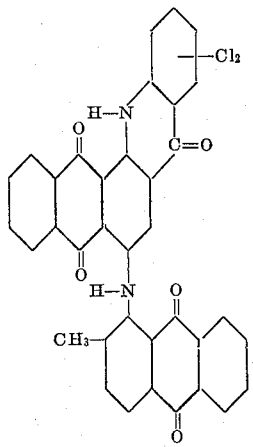

5 parts of this dried anthrimide are added to 100 parts of 93% sulphuric acid, and the mass heated to 130° C. and held at this temperature for about 1 hour. The condensation mass is then discharged on ice and water. The precipitated dyestuff is filtered off and washed thoroughly with water. The dyestuff paste after vatting dyes cotton in bluish violet shades becoming a yellowish grey to khaki upon oxidation in the air.

*Example 4*

2 parts of the dry anthrimide body of Example 3 are added to 10 parts of anhydrous aluminum chloride. The mixture is ground together and heated to 210° C. for 1 hour. The condensation product is decomposed with water and the precipitated dyestuff filtered off and washed with water. The product after vatting with sodium hydrosulphite dyes cotton in bluish violet shades which change to greenish grey upon oxidation in the air.

In the above examples as well as with the use of other Bz halogenated 1,2-acridonyl alpha-alpha'-dianthrimides the proportion of reactants can be modified to a wide degree without departing from the scope of our invention. The temperature of the reaction can also be varied throughout a wide range. It will be readily understood that other amino-anthraquinone bodies may be used for preparing the initial materials, provided of course they do not contain substituents which are more reactive toward halogen than the amino group. Where the amino anthroquinone body contains hydrolyzable groups, and where sulphuric acid is used for the condensation, care must be taken lest decomposition of such hydrolyzable groups take place. This can be avoided by the use of substantially lower temperatures. The exact temperature in the use of sulphuric acid can generally be determined by starting the reaction at lower temperatures as is done in the given examples and heating up slowly. Condensation in sulphuric acid is usually noted by a change in color of the sulphuric acid solution. Various strengths of sulphuric acid even stronger than that indicated may be employed.

We claim:

1. In the process of producing a novel dyestuff, the step which comprises condensing a Bz-halogen-1,2-acridonyl-alpha-alpha'-dianthrimide by the aid of an acid condensing agent.

2. In the process of producing a novel dyestuff the step which comprises condensing Bz-dichloro-1,2-acridonyl-4-alpha'-dianthrimide with an acid condensing agent.

3. The process which comprises reacting a poly - halogen 1(N),2-authraquinone-acridone, having halogen in the Bz nucleus and also in an alpha position on the anthraquinone nucleus, with an alpha amino anthraquinone to form a Bz halogen - 1,2 - acridonyl - alpha - alpha' - di - anthrimide, and condensing this intermediate product by the aid of an acid condensing agent.

4. The process which comprises reacting a poly-halogen 1(N)2 - anthraquinone - acridone, having halogen in the Bz nucleus and also in the 4-position of the anthraquinone nucleus, with an alpha amino anthraquinone to form a Bz-halogen-1,2-acridonyl-4,1'-dianthrimide, and condensing this intermediate product by the aid of an acid condensing agent.

5. The process which comprises reacting a trichlor-1(N),2-anthraquinone-acridone, containing two chlorine atoms in the Bz nucleus and a chlorine atom in the 4- position of the anthraquinone nucleus, with alpha amino anthraquinone to form Bz-dichloro-1,2-acridonyl-4,1'-dianthrimide, and condensing this intermediate product by the aid of acid condensing agents.

6. The process which comprises reacting a trichlor-1(N),2-anthraquinone-acridone, containing two chlorine atoms in the Bz nucleus and a chlorine atom in the 4- position of the anthraquinone nucleus with alpha amino anthraquinone to form Bz - dichloro - 1,2 - acridonyl - 4,1'-dianthrimide, and condensing this intermediate product by the aid of an acid condensing agent.

7. Vat dyestuffs obtainable by condensing a Bz-halogen-1,2-acridonyl - alpha, alpha'- dianthrimide by the aid of an acid condensing agent, which dye grey to khaki shades.

8. Vat dyestuffs obtainable by condensing Bz-dichloro - 1,2 - acridonyl - 4,1' - dianthrimide with the aid of an acid condensing agent.

IVAN GUBELMANN.
ROBERT J. GOODRICH.
WILLIAM DETTWYLER.